United States Patent [19]

Mastrangelo

[11] Patent Number: 5,316,619
[45] Date of Patent: May 31, 1994

[54] CAPACITIVE SURFACE MICROMACHINE ABSOLUTE PRESSURE SENSOR AND METHOD FOR PROCESSING

[75] Inventor: Carlos H. Mastrangelo, Ann Arbor, Mich.

[73] Assignee: Ford Motor Company, Dearborn, Mich.

[21] Appl. No.: 13,919

[22] Filed: Feb. 5, 1993

[51] Int. Cl.$^5$ .................. H01L 21/306; B44C 1/22
[52] U.S. Cl. ..................... 156/644; 156/650; 156/657; 156/659.1; 156/662; 437/233; 437/919; 73/715
[58] Field of Search ............... 156/643, 644, 648, 650, 156/656, 657, 659.1, 662; 437/228, 233, 241, 901, 919, 921; 29/621.1; 338/4; 357/26; 73/715, 718, 720, 724, 726

[56] References Cited

U.S. PATENT DOCUMENTS

| | | | |
|---|---|---|---|
| 3,539,705 | 11/1970 | Nathanson et al. | 174/68.5 |
| 3,846,166 | 9/1972 | Saiki et al. | 117/212 |
| 4,665,610 | 5/1987 | Barth | 437/901 X |
| 4,740,410 | 4/1988 | Muller et al. | 428/133 |
| 4,744,863 | 5/1988 | Guckel et al. | 156/653 |
| 4,808,549 | 2/1989 | Mikkor et al. | 156/647 X |
| 4,849,070 | 7/1989 | Bly et al. | 156/643 |
| 4,861,420 | 8/1989 | Knutti et al. | 156/654 X |
| 4,895,616 | 1/1990 | Higashi et al. | 156/647 |
| 4,975,390 | 12/1990 | Fujii et al. | 437/228 |

OTHER PUBLICATIONS

Article entitled "An Thin Film Capacitive Pressur Sensor", by Yoshiyuki Ishikura et al.; Technical Digest of the 11th Sensor Symposium, 1992, pp. 149-152.
Article entitled "Capacitive Silicon Pressure Sensor Based on the One-Side Wafer Processing", by J. M. Lysko et al.; 1991 IEEE, pp. 685-688.
Arthur Adamson, "Physical Chemistry of Surfaces", 5th Edition, pp. 385-387.
Williams et al, "Wetting of thin layers of SiO$_2$ by water", Applied Physics Letters, vol. 25, No. 10, Nov. 1974.
Scheeper et al, "Surface Forces in Micromachined Structures", Micromechanics Europe 1990, pp. 26-27.
Guckel et al, "Fabrication of Micromechanical Devices from Polysilicon Films with Smooth Surfaces", Sensors and Actuators, 20(1989), pp. 117-122.
Oppana et al, "Control of Residual Stress of Polysilicon Thin Films by Heavy Doping in Surface Micromachining", Transducers 1991, pp. 957-960.
Takeshima et al, "Electrostatic Parallelogram Actuators", Transducers 1991, pp. 63-66 1991.
"Surface and colloid Science", vol. 2, 1969, pp. 25-153.
Ishikura et al, "A Thin Film Capacitive Pressure Sensor", Techanical Digest of the 11th Sensor Symposium, 1992, pp. 149-152.

*Primary Examiner*—William Powell
*Attorney, Agent, or Firm*—Richard D. Dixon; Roger L. May

[57] ABSTRACT

A polysilicon diaphragm is formed on top of a sacrificial layer deposited upon a semiconductor substrate, where the thickness of the layer is controllable. The sacrificial layer is removed to define a diaphragm cavity, which is sealed with a plug. Electrodes within the surfaces defining the cavity deflect in response to variations in pressure, while providing a very small and minimum parasitic capacitance.

8 Claims, 4 Drawing Sheets

CAPACITIVE SURFACE MICROMACHINE ABSOLUTE PRESSURE SENSOR AND METHOD FOR PROCESSING

FIELD OF THE INVENTION

This invention relates to the field of micromachined processing techniques and semicondctor devices, and more particularly to absolute pressure sensors formed with polysilicon flexible diaphragms formed on semiconductor substrates.

BACKGROUND OF THE INVENTION

In order to provide for durable, low cost, highly accurate absolute pressure sensors, it is desirable to utilize modern semiconductor processing techniques for machining the critical parts of the sensor, rather than to manufacture the parts separately as taught in the prior art.

Guckel et al. in U.S. Pat. No. 4,744,863 discloses the use of a sealed cavity semiconductor pressure transducer employing a flexible, polysilicon deformable diaphragm that is formed over a sacrificial oxide post on a semiconductor substrate. The sacrificial post includes a plurality of weblike appendages extending along the substrate beyond the periphery of the post. After the diaphragm material is conformally deposited on the post, the periphery of the diaphragm material is etched away to reveal the sacrificial oxide. The sacrificial oxide is then etched away beneath the flexible diaphragm in order to define a diaphragm cavity. The holes formed in the circumference of the diaphragm from the web appendages that have been etched away are then sealed in order to form the diaphragm cavity.

The preferred embodiment uses piezoresistive current conducting components that are deposited on the flexible diaphragm. The resistance of these deposited materials will change in proportion to the deformation of the flexible diaphragm as the ambient pressure changes with respect to the pressure sealed within the diaphragm cavity. At column 6, at lines 47–63, mention is also made of using the structure for carrying two plates of a capacitive sensor such that the capacitance will change in response to the deflection of the diaphragm, but no capacitive sensor embodiments or teachings are provided.

In contrast to the prior art, the present invention utilizes a polysilicon diaphragm that is formed on top of a sacrificial oxide that was previously deposited on a silicon substrate, where the thickness of the sacrificial oxide layer is generally equal to the thickness of the diaphragm cavity to be formed. The use of a highly controllable silicon dioxide sacrificial layer on the silicon wafer yields a capacitor having a very small capacitance and minimum parasitic capacitance. The fabrication process does not require the bonding of patterned structures for the diaphragm. The manufacturing process can be controlled such that very low cost sensors can be manufactured without calibration steps.

SUMMARY OF THE INVENTION

A primary object of the present invention is to provide a sensor pair suitable for ratiometric measurements of absolute pressures. The sensors will not require calibration and adjustment through the use of precise alignment and dimensioning of key elements such as the capacitor electrodes and the diaphragm. A second object is to provide efficient and long lasting sealing plugs for the sensor pair, one gas permeable and the other non-permeable.

A deformable polysilicon diaphragm of a capacitive surface micromachined absolute pressure sensor, together with a processing method, are described in accordance with the present invention. The method includes the steps of masking a surface of a semiconductor substrate so as to expose a selected area thereof. The exposed area of the substrate is selectively doped so as to define a first conductive well that defines a first conductor of the capacitive sensor. Next, a first sacrificial layer is conformably deposited over at least the first conductive section of the substrate and circumferential sections of the mask that define the selected area. A polysilicon diaphragm layer then is conformably deposited over the first sacrificial layer and seals with the mask layer. The polysilicon diaphragm layer is selectively doped at least in the area generally coextensive with the first conductive section in the substrate so as to make the polysilicon diaphragm conductive, thereby forming the second conductive section of the capacitive sensor.

An access opening is selectively etched through the polysilicon diaphragm into the sacrificial layer. A wet etching solution is introduced through the access opening for removing the first sacrificial layer from beneath the polysilicon diaphragm, thereby defining a diaphragm cavity coextensive with the removed portion of the first sacrificial layer. The wet etchant within the polysilicon diaphragm cavity is then freeze-dried and removed from the diaphragm cavity through the access opening by sublimation, which prevents the capillary deflection of the polysilicon diaphragm as the wet etchant is removed. A plug is selectively deposited within and for sealing the access opening without coating or substantially reducing the volume of the diaphragm cavity. This process produces a device whereby the deflection of the polysilicon diaphragm layer responsive to variations between the ambient pressure and the pressure sealed within the diaphragm cavity causes a corresponding change in the capacitance between the first and second conductive sections of the capacitor.

BRIEF DESCRIPTION OF THE DRAWINGS

Further objects, features, and advantages of the invention will be apparent from references to the following detailed specification when taken in conjunction with the attached drawings.

DESCRIPTION OF THE PREFERRED EMBODIMENT

The present invention relates to a capacitive surface micromachined sensor suitable for the measurement of absolute gas pressure. The structure consists of a polysilicon diaphragm suspended approximately 0.2 $\mu$m above a silicon substrate. The sensor has a pressure range of 14 PSI, and a nominal capacitance of 1.5 pF with a full scale span of 0.35 pF. Each device includes a matched reference capacitor and occupies 0.19 mm² area.

Figure 1:
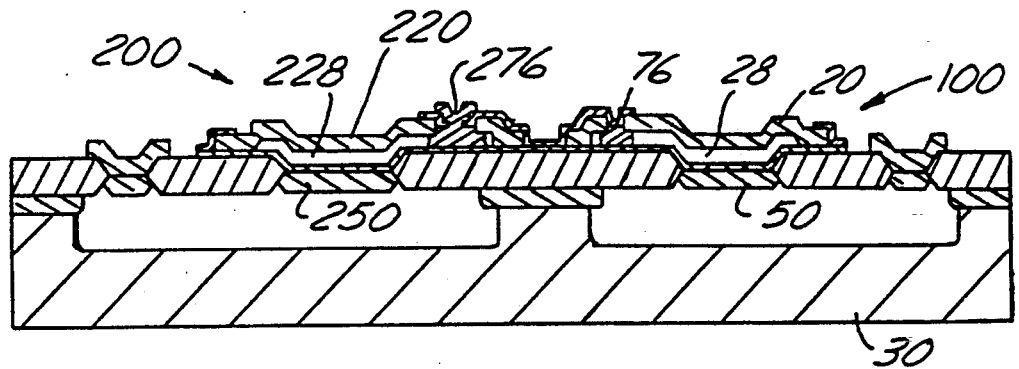
FIG. 1 illustrates a frontal cross-section view of a capacitive absolute pressure sensor and a reference sensor in accordance with the present invention.
Figure 2:
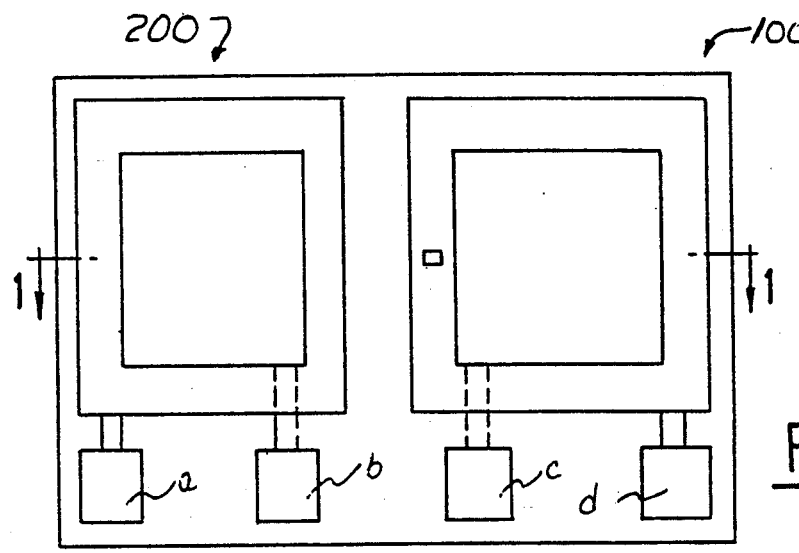
FIG. 2 illustrates a top perspective view of the embodiment shown generally in FIG. 1, including the pads for coupling the electrical signals from the two sensors.

FIGS. 1 and 2 illustrate an absolute pressure sensor 100 suitable for the measurement of gas pressure, such as the pressure of the intake manifold air pressure (MAP) or barometric air pressure (BAP). The sensor comprises two, 2 plate air gap capacitors. A moving diaphragm electrode 20 is made of polysilicon and the stationary electrode is fabricated in the substrate 30. The top electrode 20 forms a hermetically sealed diaphragm cavity 28 at a fixed pressure. The pressure difference between the diaphragm cavity 28 and the exterior of the sensor deflects the top electrode 20. This design does not use the area necessary for the propagation of the (111) planes as with most bulk silicon micromachined pressure sensors. As a result, the area is extremely small. An unsealed matched reference capacitor 200 of similar construction is included for ratiometric measurements, and includes a permeable polyimide seal 276.

Polycrystalline silicon is selected as the material for the diaphragm 20 since it is one of the most widely studied thin-film material. The electrode gap defined between the substrate 30 and the diaphragm 20 is on the order of a few hundred nanometers in vertical height, which allows a device capacitance on the order of 1–2 pF. This capacitance is large enough to be sensed with off chip circuits. As shown in FIG. 2, the four bonding pads of the chip a, b, c, and d are located on the same side of the die for easy interconnection to the off chip detection circuit. These sensors can be manufactured to meet a ±10% error specification in their capacitance to pressure transfer characteristic without calibration. This reduces the total cost of the sensor significantly.

DESIGN EXAMPLE

The following example is provided for an air intake manifold pressure sensor (MAP) application that measures air pressure between 0–10⁵ pa (0–14 psi). In this design, there are three design variables; the diaphragm width w, its thickness t, and the electrode spacing d.

The sensor must meet several design criteria: a) the capacitance of the sensor must be above a minimum $C_{min}$; b) the device must have a full pressure range of $P_r$, and it must be able to withstand the overpressure $P_{ov}$; c) the pull-in voltage of the diaphragm must be greater than $V_{pmin}$; and d) the variability of the load deflection curve subject to process variations must be below a threshold $\epsilon_0$. Furthermore, the device area and cost must be minimized.

The pressure design problem may be treated as an optimization problem with equality and nonequality constraints. Ignoring the diaphragm residual stress, the equation that determines its center load deflection curve is given by $$z_m \approx \frac{\alpha w^4 P}{D}, \quad D = \frac{E t^3}{12(1-\nu^2)} \tag{1}$$

The electrode gap is designed with the criteria that $d = z_m(P_r)$.

$$d = \frac{\alpha w^4 P_r}{D} \tag{2}$$

The rupture condition for this diaphragm is independent of its width w. Instead, the diaphragm ruptures when its maximum stress is equal to the fracture stress $\sigma_f$, and its deflection is equal to d. To prevent the plate fracture, the condition $$\left(\frac{w}{t}\right) \leq \sqrt{\frac{\sigma_f}{\beta P_{ov}}} \tag{3}$$

must be satisfied. Using Equations (2) and (3) and using $P_r = P_{ov}$, w may be eliminated as follows:

$$d \leq \left(\frac{12\alpha(1-\nu^2)\sigma_f^2}{\beta^2 P_{ov} E}\right) t \tag{4}$$

which coupled with Equation (2) yields $$\left(\frac{w}{t}\right) \leq \left(\frac{\sigma_f^2}{\beta^2 P_r P_{ov}}\right)^{\frac{1}{4}} \tag{5}$$

The capacitance of the sensor is $$C = \frac{\epsilon_0 w^2}{d} \geq C_{min} \tag{6}$$

which coupled with Equation (2) yield the constraint $$w = \sqrt{\frac{\epsilon E t^3}{12\alpha C_{min} P_r (1-\nu^2)}} \tag{7}$$

In this design, the deflecting diaphragm is the top electrode. Therefore, the pull-in voltage is dependent on its thickness $$V_p \approx \frac{64}{7} \sqrt{\frac{E t^3 d^3}{5(1-\nu^2) w^4 \epsilon_0}} \geq I_{pmin} \tag{8}$$

which now coupled with Equation (2) yield the new constraint $$w = \frac{(5\epsilon_0)^{\frac{1}{4}}(7 V_{pmin} E)^{\frac{1}{4}}}{(64)^{\frac{1}{4}}(1728 \alpha^3 P_r^3)^{\frac{1}{4}}} t^{\frac{3}{4}} \tag{9}$$

Using Equations (16)–(19) (see below) the total relative error of the maximum deflection is $$\epsilon_{zm} \approx \left(16\left(\frac{\Delta w}{w}\right)^2 + 9\left(\frac{\Delta t}{t}\right)^2 + \left(\frac{\Delta d}{d}\right)^2 + \left(\frac{\Delta E}{E}\right)^2\right)^{\frac{1}{2}} \leq \epsilon_0$$

In modern silicon processing, the Young's modulus of polysilicon may be controlled within 5%. Note that for deposited films $\Delta t/t$ and $\Delta d/d$ are constant. The width variation $\Delta w \simeq 1-2$ $\mu$m is fixed and limited by the lithographic process. Thus Equation (10) is equivalent to setting a minimum width limit. An additional constraint is in the maximum thickness of the diaphragm. For most practical purposes $t \leq 4$ $\mu$m thick. Furthermore, a limit in the minimum electrode gap distance is assumed to be 200 nm. This results in the constraint $$w = \sqrt{\frac{C_{min}d_{min}}{\epsilon_0}} \quad (11)$$

Figure 3:
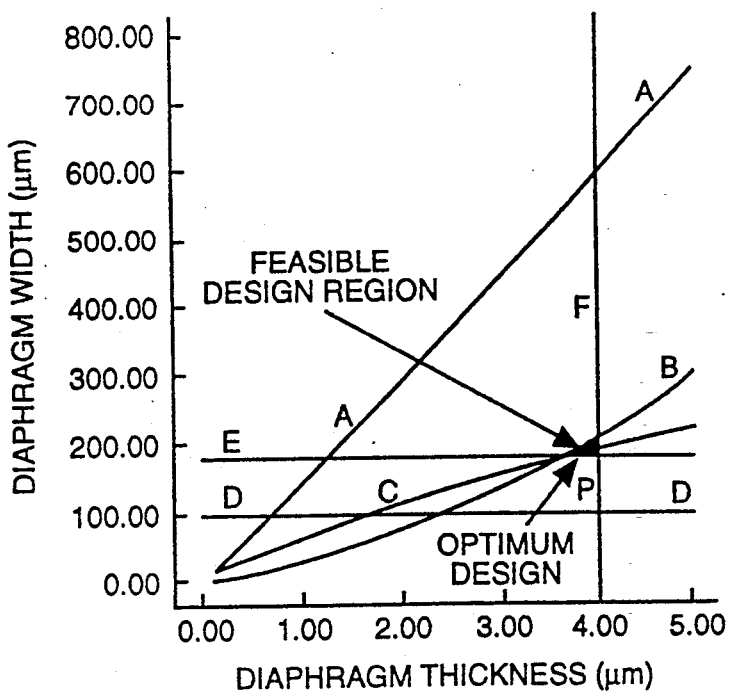
FIG. 3 is a graphical illustration of the design constraints considered in optimizing the sensor in accordance with the present invention.

The area of the device plus reference capacitor is $$A_c \approx (w+3r+c+p)(2w+3r+c) \quad (12)$$

where r is the outer rim of the chip, and p is the width of the bonding pad ($\simeq 100$ $\mu$m). An optimization program can now be used to find the device that meets all the constraints and gives a minimum cost (area). For the purposes of illustration, this procedure is shown graphically in FIG. 3. Curve A is given by the rupture condition. Curves B and C are generated by the $C_{min}$ and $V_{pmin}$ constraints. Curves D and E are generated by the variability and electrode gap conditions. Finally, Curve F is the electrode thickness condition. The feasible design region is the shaded area of FIG. 3. Point P meets all the constraints with a minimum device area.

For most practical purposes, the minimum width is determined by the $C_{min}$ constraint and the pull-in constraint. Setting Equations (7) and (9) equal, we find, $$w \propto \sqrt{\frac{C_{min}V_{pmin}}{P_r}} \quad (13)$$

Thus, the diaphragm width is proportional to the geometric mean of $C_{min}$ and $V_{pmin}$. Hence Equation (13) requires that w must increase if either $C_{min}$ or $V_{pmin}$ increase.

In an optimized example, each device has a 1.5 pF capacitance with a 350 fF full-scale span and an 11 V pull-in voltage. Each die, including its own matched reference capacitor, occupies an area of 0.19 mm$^2$.

Fabrication Process

FIG. 4 illustrates the micromachine fabrication sequence. The substrate 30 is a (100) p-type silicon wafer with a resistivity of 10–30 $\Omega$-cm. First, the substrate is cleaned in piranha solution and a thin 100 nm pad oxide 31 is grown on the wafer. The well lithography is then performed and the oxide is etched in 10:1 HF. The wafers are next ion implanted with a phosphorus dose of $4 \times 10^{12}$ cm$^{-2}$ at an energy of 150 keV, resulting in the device cross-section shown in FIG. 4 A. The photoresist is removed and the samples are piranha cleaned. The wafers are given a high temperature anneal in a dry oxygen environment at 1150° C. for about four hours, and then four hours in an N$_2$ atmosphere to drive-in the well dopants resulting in the structure of FIG. 4B. The junction depth of the well 32 is $x_j \simeq 3$ $\mu$m.

The oxide 33 formed during the diffusion is then stripped in a 5:1 BHF etch solution. After piranha cleaning, 100 nm of pad oxide 34 is grown in dry oxygen at a temperature of 1000° C. for 20 minutes. Following the oxide growth, a thin 100 nm layer of stoichiometric LPCVD silicon nitride 36 is grown on the wafers. The active area lithography is then performed.

Figure 4A:
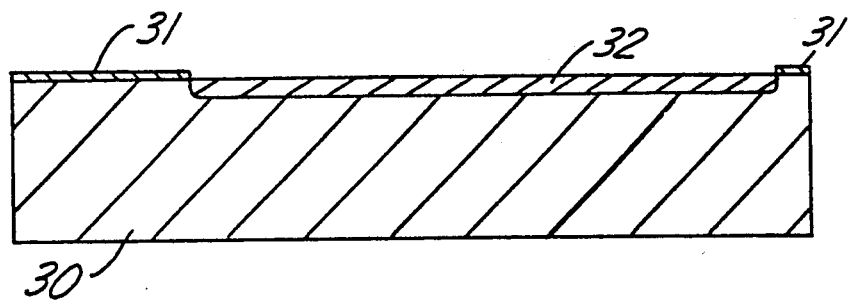
FIGS. 4 A through L illustrate cross-sectioned views of the capacitive sensors formed on the silicon wafer at various steps in the manufacturing process.
Figure 4B:
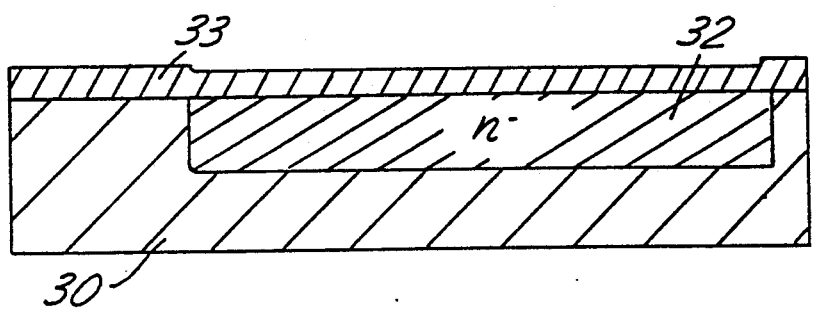
Figure 4C:
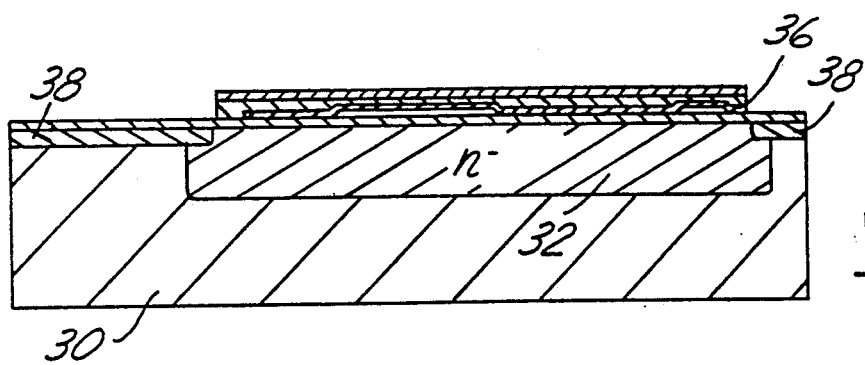
Figure 4D:
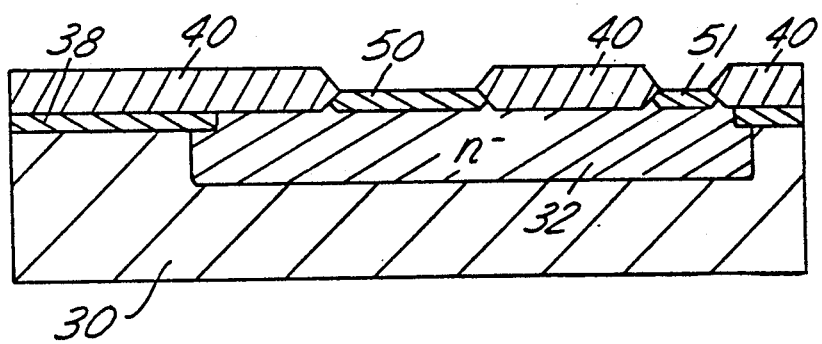

The nitride then is etched down to the pad oxide in an SF$_6$ Plasma reactor. The field implant regions 38 are then lithographically, and the wafers are given a blanket boron implant with a dose of $10^{13}$ cm$^{-2}$ at an energy of 100 keV as shown in FIG. 4C. The samples are then cleaned in piranha solution, and the pad oxide 31 is stripped in 10:1 HF. A wet oxidation is performed on the samples to grow about 1 $\mu$m of thermal oxide in the exposed areas. This layer constitutes the local passivation 40 as shown in FIG. 4D. The remaining nitride is then stripped in a hot H$_3$PO$_4$ bath heated at 150° C. The samples are then cleaned and a high-dose $5 \times 10^{15}$ cm$^{-2}$ arsenic implant is applied at an energy of 180 keV. This implant forms the bottom electrode 50 of the capacitor and a contact pad 51.

Figure 4E:
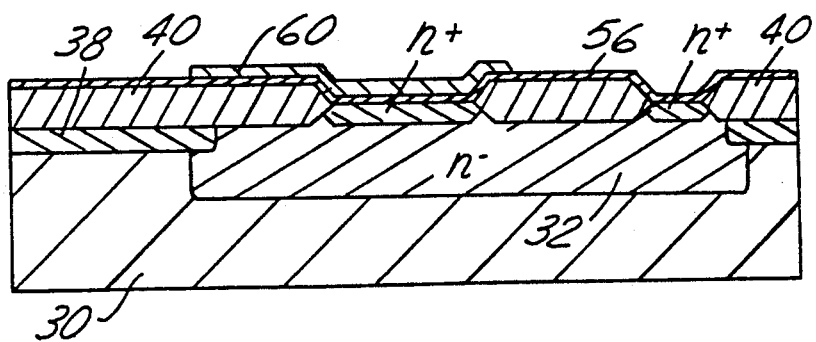

After cleaning the samples in piranha, a thin 20nm-thick pad oxide is thermally grown in dry oxygen at 900° C. for 25 minutes. The wafers are immediately transferred to the LPCVD nitride furnace to grow an additional 50 nm of low-stress silicon nitride 56. A 0.2 $\mu$m layer of LTO 60 is then grown on the wafers to form the interelectrode spacing. The layer 60 is then patterned and etched in a 5:1 BHF solution in the plate anchor areas as shown in FIG. 4E.

Figure 4F:
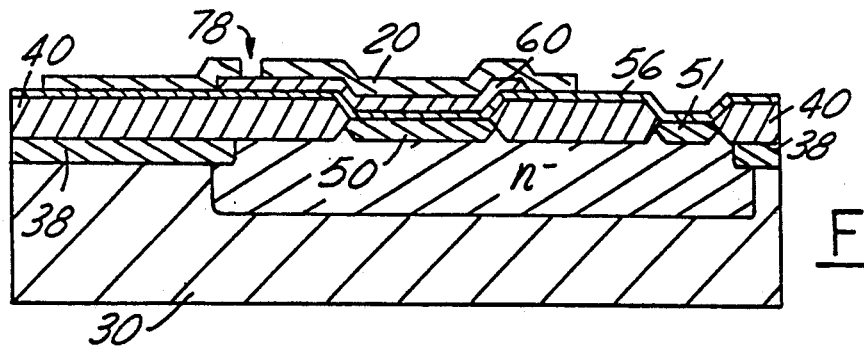

Next, the sample is cleaned thoroughly. A polysilicon diaphragm 20 is grown in three steps. The first 1.5 $\mu$m of the polysilicon is deposited, and the samples are given a high-dose $10^{16}$ cm$^2$ phosphorus implant at 100 keV to dope the material. After this step, the samples are cleaned and the remaining 1.5 $\mu$m of the polysilicon is deposited. The wafers then are given an N$_2$ anneal at 1000° C. for one hour for the implant activation and stress relaxation of the polysilicon diaphragm. The diaphragm lithography is performed next. The samples are given a short dip into 10:1 HF and rinsed. The diaphragm polysilicon 20 is then wet etched in a 3:33:64 NH$_4$F: H$_2$O: HNO$_3$ solution down to the thin LTO layer (or the nitride layer 56) as shown in FIG. 4F.

Figure 4G:
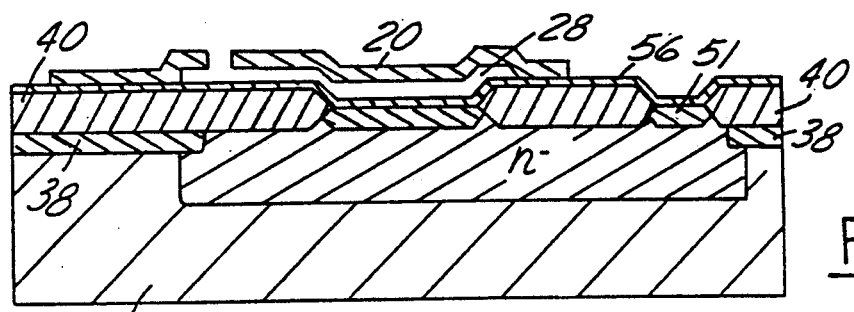

After removal of the photoresist and piranha cleaning, the samples are immersed into concentrated HF to remove the 0.2 $\mu$m-thick sacrificial oxide 60. The undercut etch rate is about 50–80 $\mu$m per hour. The samples are then carefully rinsed in DI water for 10 minutes, and given a piranha clean for 20 minutes. The samples are immersed in 10:1 HF water for 10 minutes and given a final rinse in DI water for 20 minutes. The wafers are then transferred to a tank containing a mixture of DI water and cyclohexane. The samples are quickly transferred to a freezer to freeze the liquid solution clinging to the wafer. After the liquid is frozen, the samples are transferred to a vacuum system at a pressure of 50 mT. After pumpdown, the chamber is heated to 100° C. to sublime the ice and eliminate water condensation on the samples. This procedure minimizes capillary forces on the polysilicon diaphragm 20 during the removal of the liquid from within the newly formed diaphragm cavity 28. The device at this stage is shown in FIG. 4G.

Figure 4H:
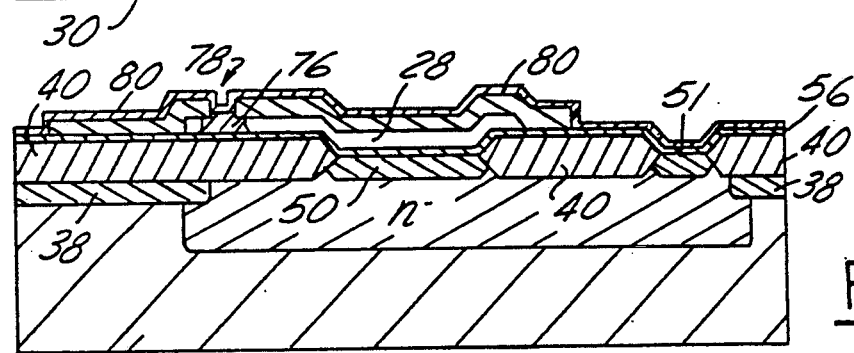

After the sublimation is complete, the samples are placed in a PECVD SiO$_2$ reactor and 250 nm of oxide 76 is deposited on the samples. This oxide 76 seals the etching holes 78 without penetrating the diaphragm cavity 28 into the area of the bottom electrode 50. The PECVD oxide 76 is patterned and removed from the top of the diaphragm. After piranha cleaning, the etching holes 78 are permanently sealed with a thin 100 nm-thick coating of low-stress silicon nitride 80 as shown in FIG. 4H.

Figure 4I:
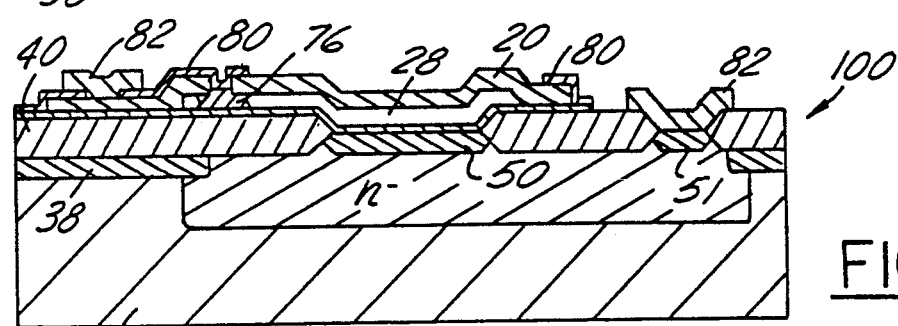

A thin 200 nm layer of LTO is then deposited on the samples which serves as a mask for the nitride removal. The LTO next is patterned and etched in 5:1 BHF, and the photoresist is removed. The samples are then immersed in a hot $H_3PO_4$ solution to remove the silicon nitride layer 80 from the diaphragm and the bottom electrode contact pad 51. After rinsing, the sample is immersed in 5:1 BHF to strip the mask LTO. After this step, the sample is cleaned and dipped into 5:1 BHF temporarily. A 1 $\mu$m layer of AlSi 82 is sputtered on the samples. The metal lithography is then performed and the metal is etched with aluminum etchant. The samples are then cleaned in acetone and sintered in forming gas at 400° C. for one hour. Two generally identical capacitive elements are thus formed, as shown in FIG. 4I.

Figure 4J:
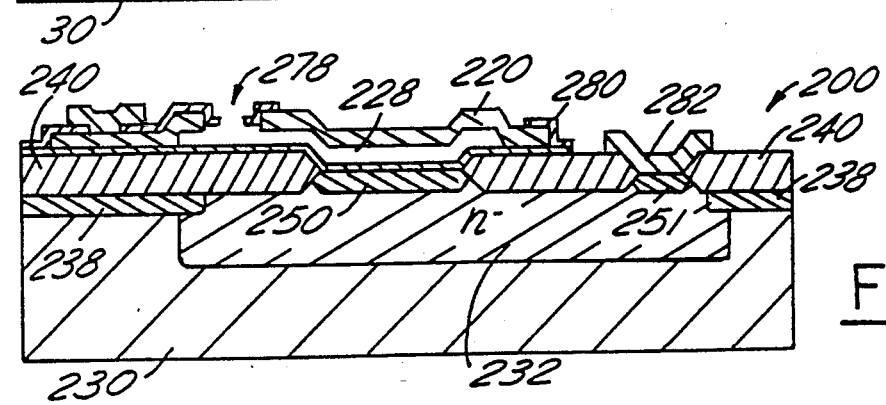

The access hole lithography for the reference capacitor 200 is then performed. The nitride 80 is removed with a $SF_6$ plasma, and the PECVD oxide 76 is etched with 5:1 BHF. The photoresist is then removed with an $O_2$ plasma and the samples are freeze-dried as shown in FIG. 4J.

Figure 4K:
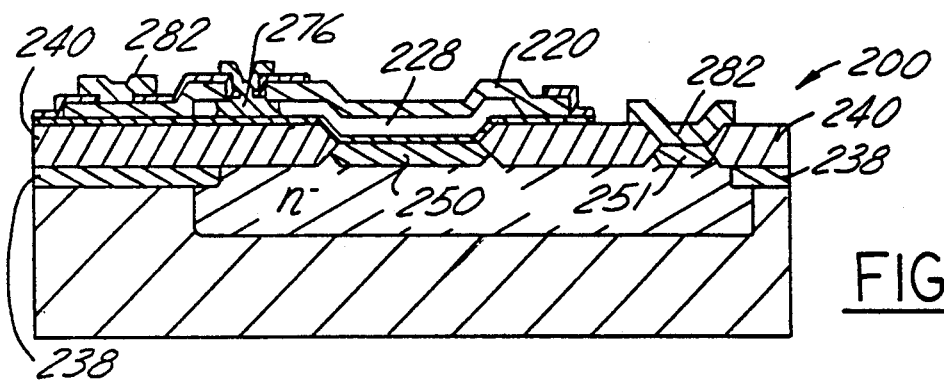

A thin layer of polyimide 276 is next dispersed on the wafers which seals the access hole 278 while allowing it to breathe. After a short bake, the polyimide lithography is performed. The developer attacks the polyimide in the exposed areas. The photoresist is then removed with acetone leaving the polyimide 276 plug behind. This film next is cured at 300° C. for one hour yielding a finished device as shown in FIG. 4K. The polyimide plug 276 is permeable to atmospheric gasses and allows the diaphragm cavity 228 of the reference capacitor breaths, thereby making the position of the capacitor plates 220 and 250 generally independent of atmospheric pressure changes.

Figure 4L:
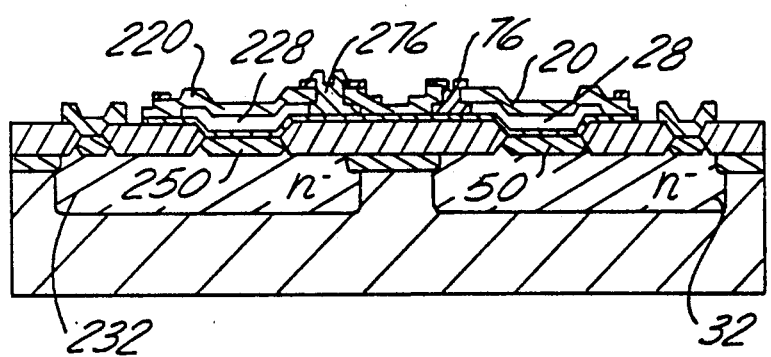

A thick layer of photoresist is next dispensed on the wafers. The samples then are scribed 13 mils deep, and the soft protective resist is removed with acetone. After rinsing the samples for 20 minutes, the samples are ready to be bonded to individual packages. The final structure showing sensing capacitor 100 and reference capacitor 200 is shown in FIG. 4L.

This absolute pressure sensor/transducer includes many features found in MOSFET's, including a localized oxidation, channel-stop implants, and substrate diffusions. The implementation of a full transducer, including CMOS circuits, requires only a few (10-20) additional processing steps. This transducer is fully integrable.

While preferred embodiments and process examples have been shown and described herein, it will be understood that such embodiments and process examples are provided by way of example only, Numerous variations, changes and substitutions will occur to those skilled in this art without departing from the spirit of the invention. Accordingly, it is intended that the appended claims cover all such variations as fall within the spirit and scope of the invention.

I claim

1. A method for producing a surface micromachined capacitive absolute pressure sensor, comprising the steps of:
   a. masking the surface of a semiconductor substrate so as to expose a selected area thereof;
   b. selectively doping the selected area of the substrate so as to define a first conductive electrode section of the capacitive sensor;
   c. conformally depositing a first sacrificial layer covering at least the first electrode section of the substrate and circumferential sections of the mask that define the selected area;
   d. conformally depositing a polysilicon diaphragm layer over the first sacrificial layer;
   e. selectively doping the diaphragm layer at least in the area generally coextensive with the first electrode section in the substrate so as to make the diaphragm conductive, thereby forming a second electrode section of the capacitive sensor;
   f. selectively etching an access opening through said diaphragm layer and into the sacrificial layer;
   g. selectively wet etching through the access opening, and removing the first sacrificial layer in an area juxtaposed with the first and second electrode sections so as to define a diaphragm cavity generally coextensive with the removed portion of the first sacrificial layer;
   h. freeze-drying the wet etchant within the diaphragm cavity;
   i. removing the wet etchant from the diaphragm cavity through the access opening by sublimation, thereby preventing the capillary deflection of the polysilicon diaphragm as the wet etchant is removed; and
   j. selectively depositing a plug within and for sealing the access opening without coating or substantially reducing the volume of the diaphragm cavity adjacent the first electrode section; whereby the deflection of the diaphragm layer responsive to variations between the ambient pressure and the pressure sealed within the sealed diaphragm cavity causes a corresponding change in the capacitance between the first and second electrode sections.

2. A method as described in claim 1 wherein step e further includes a subsequent step of forming a second conformal layer of polysilicon over the diaphragm.

3. The method as described in claim 1 wherein in step (c) is carried out until the first sacrificial layer has a thickness of between 0.1 and 1.0 micrometers.

4. The method as described in claim 3 wherein step (d) is carried out by depositing polycrystalline silicon from silane gas at temperature and pressure conditions such that a solid layer of polycrystalline silicon is formed over the sacrificial layer.

5. The method as described in claim 1 wherein step (j) further includes a subsequent step of conformally applying a layer of SiN over the plug and adjacent areas of the diaphragm for sealing the diaphragm cavity.

6. The method as described in claim 1 wherein step (j) includes the preliminary steps of:
   identifying adjacent pairs of commonly processed sensors on the substrate and identifying one of each pair as a reference sensor, and
   selectively masking the access opening of the reference sensor so as not to receive the plug for sealing the diaphragm cavity therein;
   and further including the subsequent steps of:
   (k) selectively removing the mask covering the access opening in the reference sensor, and
   (l) selectively depositing a gas-permeable plug within the access opening in the reference sensor without coating or substantially reducing the volume of the diaphragm cavity in the area of the first electrode, whereby the capacitance of the reference sensor may be compared with the absolute pressure sensor for ratiometric measurements.

7. A surface micromachined capacitive absolute pressure sensor, comprising:
- a semiconductor substrate having a selected area thereof doped for defining a first conductive electrode section of the capacitive sensor;
- a first sacrificial layer conformally deposited for covering at least said first electrode section of said substrate;
- a polysilicon diaphragm conformally deposited over said first sacrificial layer, said diaphragm selectively doped in the area generally coextensive with said first electrode section in said substrate for making said diaphragm conductive, thereby forming a second electrode section of the capacitive sensor;
- an access opening selectively etched through said polysilicon diaphragm on a surface opposite from said substrate for enabling the selective removal of said first sacrificial layer therethrough, said first sacrificial layer having been removed from said diaphragm in an area juxtaposed with said first electrode section so as to define a diaphragm cavity;
- a plug located within and for sealing said access opening without coating or substantially reducing the volume of said diaphragm cavity adjacent said first electrode section;

whereby the deflection of said diaphragm layer responsive to variations between the ambient pressure and the pressure sealed within said sealed diaphragm cavity causes a corresponding change in the capacitance between said first and second electrode sections.

8. The sensor as described in claim 7 further comprising an adjacent one of said sensors on said substrate for use as a reference sensor, said reference sensor including a gas-permeable plug located within said access opening for sealing said diaphragm cavity from solid materials but not from the movement of gasses therethrough, whereby the capacitance of said reference sensor may be compared with the absolute pressure sensor for ratiometric measurements.

* * * * *